United States Patent
Tanaka et al.

(10) Patent No.: US 10,780,768 B2
(45) Date of Patent: Sep. 22, 2020

(54) TORQUE ROD

(71) Applicant: SUMITOMO RIKO COMPANY LIMITED, Komaki-shi, Aichi (JP)

(72) Inventors: Shingo Tanaka, Komaki (JP); Takashi Hayashi, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 52 days.

(21) Appl. No.: 16/167,878

(22) Filed: Oct. 23, 2018

(65) Prior Publication Data

US 2019/0054812 A1 Feb. 21, 2019

Related U.S. Application Data

(63) Continuation of application No. PCT/JP2017/042662, filed on Nov. 28, 2017.

(30) Foreign Application Priority Data

Apr. 25, 2017 (JP) .................... 2017-086055

(51) Int. Cl.
*B60K 5/12* (2006.01)
*F16F 15/08* (2006.01)
(Continued)

(52) U.S. Cl.
CPC .............. *B60K 5/1291* (2013.01); *B60K 5/12* (2013.01); *B60K 5/1208* (2013.01);
(Continued)

(58) Field of Classification Search
CPC .......... F16F 1/38; F16F 1/3828; F16F 1/3873; F16F 15/08; B60K 5/12; B60K 5/1208;
(Continued)

(56) References Cited

U.S. PATENT DOCUMENTS

| 2,463,059 | A | * | 3/1949 | Saurer | ................... F16F 3/0873 |
| | | | | | 267/140.3 |
| 9,273,753 | B2 | * | 3/2016 | Yun | ....................... F16F 1/3849 |

(Continued)

FOREIGN PATENT DOCUMENTS

| CN | 104061265 A | 9/2014 |
| EP | 1247678 A2 | 10/2002 |

(Continued)

OTHER PUBLICATIONS

Feb. 13, 2018 International Search Report issued in International Patent Application No. PCT/JP2017/042662.

(Continued)

*Primary Examiner* — Thomas J Williams (74) *Attorney, Agent, or Firm* — Oliff PLC (57) ABSTRACT

A torque rod including: a rod member; and a rubber bushing provided at a lengthwise end of the rod member, wherein the rubber bushing includes an inner axial member, an outer tubular member, and a rubber elastic body connecting the inner axial member and the outer tubular member with each other, the lengthwise end of the rod member is fixed to the inner axial member of the rubber bushing constituted by a part separate from the rod member, and a stopper to limit a relative displacement amount of the inner axial member and the outer tubular member in the rubber bushing is constituted in contact sections of the rod member and the outer tubular member.

10 Claims, 3 Drawing Sheets

(51) Int. Cl.
  *F16F 1/38* (2006.01)
  *F16F 1/387* (2006.01)

(52) U.S. Cl.
  CPC .............. *B60K 5/1241* (2013.01); *F16F 1/38* (2013.01); *F16F 1/3828* (2013.01); *F16F 1/3873* (2013.01); *F16F 15/08* (2013.01)

(58) Field of Classification Search
  CPC ... B60K 5/1225; B60K 5/1241; B60K 5/1291
  See application file for complete search history.

(56) References Cited

U.S. PATENT DOCUMENTS

| | | | | |
|---|---|---|---|---|
| 9,707,836 | B2* | 7/2017 | Sykes | F16F 1/3849 |
| 10,131,219 | B2* | 11/2018 | Scharf | B60K 5/1266 |
| 2007/0228624 | A1* | 10/2007 | Okanaka | F16F 1/3615 |
| | | | | 267/140.11 |
| 2014/0284858 | A1* | 9/2014 | Sakata | F16F 1/3849 |
| | | | | 267/141.1 |
| 2015/0240908 | A1* | 8/2015 | Pizanti | F16M 13/02 |
| | | | | 248/634 |
| 2015/0345583 | A1* | 12/2015 | Ishikawa | F16F 3/0873 |
| | | | | 248/634 |
| 2016/0053848 | A1* | 2/2016 | Nakamura | F16F 1/3842 |
| | | | | 248/634 |
| 2016/0341275 | A1* | 11/2016 | Kaneko | F16F 15/08 |
| 2019/0054813 | A1* | 2/2019 | Tanaka | F16F 1/3828 |

FOREIGN PATENT DOCUMENTS

| | | |
|---|---|---|
| JP | 2000-65113 A | 3/2000 |
| JP | 4442371 B2 | 3/2010 |

OTHER PUBLICATIONS

Feb. 25, 2020 Office Action issued in Chinese Patent Application No. 201780031906.1.

* cited by examiner

TORQUE ROD

INCORPORATED BY REFERENCE

This application is a Continuation of International Application No. PCT/JP2017/042662 filed Nov. 28, 2017, which claims priority under 35 U.S.C. §§ 119(a) and 365 of Japanese Patent Application No. 2017-086055 filed on Apr. 25, 2017, the disclosures of which are expressly incorporated herein by reference in their entireties.

BACKGROUND OF THE INVENTION

1. Field of the Invention

The present invention relates to a torque rod used to connect a power unit to a vehicle body in a vehicle, for example, and especially relates to a torque rod including a stopper mechanism that limits a relative displacement amount between members connected mutually, and a rod member and a rubber bushing which constitute the torque rod.

2. Description of the Related Art

There has been known a torque rod that connects a power unit and a vehicle body and supports torque reaction force of the power unit. For example, as Japanese Unexamined Patent Publication No. JP-A-2000-065113 discloses, this torque rod has a structure having rubber bushings at both lengthwise ends wherein one of the rubber bushings is attached to the power unit while the other is attached to the vehicle body.

With a torque rod of conventional structure, as disclosed also in JP-A-2000-065113, an outer tubular member is formed integrally at a lengthwise end of the torque rod, and a rubber bushing having an inner axial member is assembled to the outer tubular member. The inner axial member is fixed to the vehicle body, so that the torque rod is mounted on the vehicle body.

However, in this torque rod of conventional structure, the inner axial member at the center is fixed to the vehicle body, and the outer tubular member with a large diameter is displaced relative to the vehicle body upon a load input on the radial outside. Thus, it is required to keep a further large space around the outer tubular member in the vehicle body so as to avoid interference of the outer tubular member with the side of the vehicle body. Therefore, there are problems such as difficulty in meeting a demand for compactification.

Considering these problems, the applicant of this invention discloses, in Japanese Patent No. JP-B-4442371, a torque rod wherein a rod member is a separate structure from a rubber bushing including an inner axial member and an outer tubular member. It is also disclosed about the torque rod that a lengthwise end of the rod member is connected with the inner axial member of the rubber bushing, while the outer tubular member of the rubber bushing is fixed to the vehicle body. For the torque rod of this structure, the outer tubular member is fixed to the vehicle body, so that the interference of the outer tubular member with the side of the vehicle body when a load is input is prevented, and compactification in attachment of the torque rod or the like is achieved.

However, in the torque rod disclosed in JP-B-4442371, the rod member is connected with the inner axial member of the rubber bushing which is a separate structure from the rod member. Hence, it may be difficult to secure strength and reliability with respect to a large load such as stopper load by relative contact between the inner axial member and the outer tubular member of the rubber bushing.

SUMMARY OF THE INVENTION

The present invention has been developed in view of the above-described matters as the background, and it is an object of the present invention to provide a torque rod with a novel structure which is able to achieve compactification of a space required for attachment of a rubber bushing provided at a lengthwise end of a rod member, while improving load bearing capability and enduring performance in relation to a large load such as stopper load.

A first mode of the present invention provides a torque rod comprising: a rod member; and a rubber bushing provided at a lengthwise end of the rod member, wherein the rubber bushing includes an inner axial member, an outer tubular member, and a rubber elastic body connecting the inner axial member and the outer tubular member with each other, the lengthwise end of the rod member is fixed to the inner axial member of the rubber bushing constituted by a part separate from the rod member, and a stopper to limit a relative displacement amount of the inner axial member and the outer tubular member in the rubber bushing is constituted in contact sections of the rod member and the outer tubular member.

According to the torque rod having the structure following the present mode, the contact sections in the stopper are constituted in the rod member and the outer tubular member. Thus, stopper load to limit the relative displacement amount between the inner axial member and the outer tubular member of the rubber bushing is exerted on the rod member from the outer tubular member, without interposing the inner axial member. Therefore, even in a case that a large stopper load is exerted, it is possible to easily keep strength and durability in relation to the stopper load, irrespective of the strength or the like of the fixture for the inner axial member and the rod member.

Also, in a connection section of the torque rod in relation to such connection target member as the vehicle body, the outer tubular member of the rubber bushing is fixed to the connection target member, so that the inner axial member fixed to the rod member is displaced within the outer tubular member. Therefore, in a connection section where the torque rod is connected in the connection target member, it is not required to ensure a large space around the outer tubular member. It is possible to achieve compactification of the connection section, while keeping elastic displacement amount of the torque rod connected to the connection target member via the rubber bushing relative to the connection target member.

A second mode of the present invention provides the torque rod according to the first mode, wherein the torque rod has another rubber bushing with a different outer dimension from an outer dimension of the rubber bushing, at another lengthwise end of the rod member, the outer dimension of the rubber bushing is larger than the outer dimension of the other rubber bushing, and the lengthwise end of the rod member is fixed to the inner axial member of the rubber bushing, and the stopper is constituted in the contact sections of the rod member and the outer tubular member of the rubber bushing.

With the torque rod structured following the present mode, it is possible to keep a rubber volume of the rubber elastic body constituting the rubber bushing, by increasing the outer dimension of the rubber bushing. Particularly, by applying the stopper constructed according to this invention to the rubber bushing with a larger outer dimension, it is possible to keep relative displacement amount of the inner axial member and the outer tubular member and reduce the space required for the connection section, more effectively.

A third mode of the present invention provides the torque rod according to the first or second mode, wherein the contact sections located at a lengthwise tip face of the rod member and the outer tubular member of the rubber bushing are opposed via a cushioning rubber in a lengthwise direction of the rod member so that a first stopper is constituted as the stopper.

In the torque rod with the structure of this mode, the first stopper can realize the stopper to limit the displacement amount to the relative approach direction between the connection sections for the torque rod in two connection target members, e.g., the automobile power unit and the vehicle body, which are connected with each other by the torque rod. In addition, the stopper load by contact of the contact sections in the first stopper is exerted in the lengthwise direction of the rod member. This makes it possible as well to improve the load bearing capability in the stopper by more efficiently taking advantage of compression strength of the rod member suppressing shear or bending stress, by having the stopper load act in the axial direction of the rod member, for example.

A fourth mode of the present invention provides the torque rod according to any one of the first to third modes, wherein an abutting projection configured to be inserted between opposite faces of the inner axial member and the outer tubular member of the rubber bushing is provided in the rod member and located closer to a lengthwise center of the rod member than a portion fixed to the inner axial member of the rubber bushing in the lengthwise end of the rod member is, and the abutting projection is opposed to the outer tubular member via a cushioning rubber in a lengthwise direction of the rod member so that a second stopper is constituted as the stopper.

For the torque rod structured following the present mode, the second stopper can realize the stopper to limit the displacement amount to the relative separation direction between the connection sections for the torque rod in two connection target members, e.g., the automobile power unit and the vehicle body, which are connected with each other by the torque rod. In addition, the stopper load by contact of the contact sections in the second stopper is exerted in the lengthwise direction of the rod member. This makes it possible as well to improve the load bearing capability in the stopper by more efficiently taking advantage of tensile strength of the rod member suppressing shear or bending stress, by having the stopper load act in the axial direction of the rod member, for example.

A fifth mode of the present invention provides the torque rod according to the fourth mode, wherein the abutting projection expands to both sides in a circumferential direction of the outer tubular member, and the cushioning rubber projects from an inner face of the outer tubular member toward a center of the abutting projection in the circumferential direction.

According to the torque rod constructed following the present mode, the cushioning rubber is abutted against the abutting projection before the abutting projection and the outer tubular member get into contact in the second stopper, thereby enabling buffering action.

A sixth mode of the present invention provides the torque rod according to any one of the first to fifth modes, wherein the outer tubular member of the rubber bushing has a cut-out window opened at an axial end edge thereof, and the rod member fixed to the inner axial member of the rubber bushing is disposed to extend inward and outward of the outer tubular member in a state of being inserted through the cut-out window.

With the torque rod having the structure of the present mode, there is formed the cut-out window that is opened at the axial end in the outer tubular member, while the rod member is inserted through the cut-out window and fixed to the inner axial member. Thus, for example, it is possible to superpose and fix the rod member having a shape whose center axis extends nearly linearly in the axis-perpendicular direction of the rubber bushing to the inner axial member from axial outside. This makes it possible to minimize the projection dimension in the axial direction of the rubber bushing in the torque rod. Besides, as the rod member, it becomes possible to adopt the shape whose center axis extends roughly linearly in the axis-perpendicular direction of the rubber bushing, whereby the space required for mounting the rod member can be reduced and load bearing capability can improve.

A seventh mode of the present invention provides the torque rod according to any one of the first to sixth modes, wherein an attachment projecting to an outer peripheral side is provided at the outer tubular member of the rubber bushing.

Following the torque rod of the structure according to this mode, by using the attachment provided projecting to the outer peripheral side, the outer tubular member can be readily fixed to such connection target member as the vehicle body.

An eighth mode of the present invention provides the torque rod according to any one of the first to seventh modes, wherein the end of the rod member is superposed and fixed by bolting to an axial end face of the inner axial member of the rubber bushing.

With the torque rod constructed following the present mode, the rod member and the inner axial member of the rubber bushing are fixed to each other using the bolt, whereby they can be fixed to be readily removable, with a simple structure.

A ninth mode of the present invention provides the torque rod according to any one of the first to eighth modes, wherein the rubber bushing includes lightening spaces provided at opposite sides of the inner axial member in a lengthwise direction of the rod member, and the stopper is constituted in each of the lightening spaces at the opposite sides so that the relative displacement amount of the inner axial member and the outer tubular member is limited at the opposite sides in the lengthwise direction of the rod member.

According to the torque rod of the structure with the present mode, the stopper can be constituted by taking advantage of the lightening space. This lightening space also enables adjustment of the spring characteristics of the rubber elastic body in the rubber bushing.

Moreover, the torque rod according to this invention disclosed in the first to ninth modes described above can be favorably realized by a rod member disclosed in a tenth mode described hereafter, and a rubber bushing disclosed in an eleventh mode described below.

A tenth mode of the present invention provides a rod member configured to be attached to a rubber bushing including an inner axial member, an outer tubular member, and a rubber elastic body connecting the inner axial member and the outer tubular member with each other such that the rod member constitutes a torque rod, the rod member for the torque rod comprising, at one lengthwise end thereof; a fixture to the inner axial member of the rubber bushing; and a contact section constituting a stopper to limit a relative displacement amount of the inner axial member and the outer tubular member of the rubber bushing by contact of the contact section on the outer tubular member of the rubber bushing.

An eleventh mode of the present invention provides a rubber bushing configured to be mounted at a lengthwise end of a rod member such that the rubber bushing constitutes a torque rod, the rubber bushing comprising: an inner axial member; an outer tubular member; a rubber elastic body connecting the inner axial member and the outer tubular member with each other; a fixture configured to receive the lengthwise end of the rod member, the fixture being provided in the inner axial member; and a contact section constituting a stopper to limit a relative displacement amount of the inner axial member and the outer tubular member by contact of the contact section, on the rod member, the contact section being provided in the outer tubular member.

According to the present invention, in the torque rod, it becomes possible to improve load bearing capability and enduring performance in relation to a large load such as stopper load, while decreasing the space required for attachment of the rubber bushing provided at the lengthwise end of the rod member.

BRIEF DESCRIPTION OF THE DRAWINGS

The foregoing and/or other objects, features and advantages of the invention will become more apparent from the following description of an embodiment with reference to the accompanying drawings in which like reference numerals designate like elements and wherein.

DETAILED DESCRIPTION OF EMBODIMENTS

An embodiment of the present invention will be described below in reference to the drawings.

Figure 1:
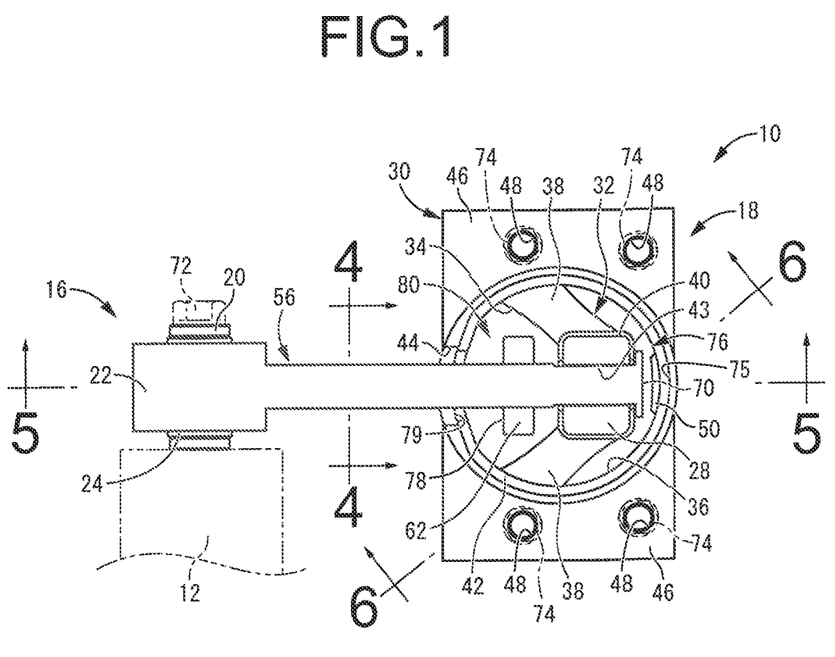
FIG. 1 is a plan view showing a torque rod as a first embodiment of the present invention.
Figure 2:
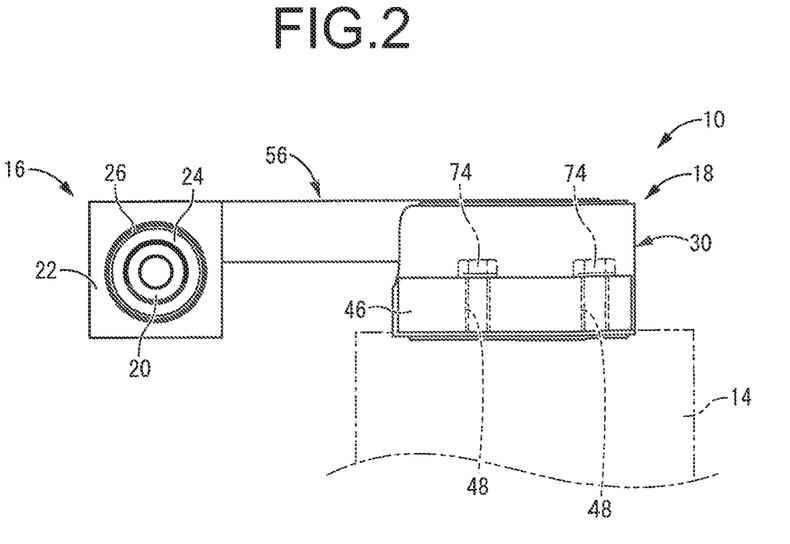
FIG. 2 is a front view of the torque rod shown in FIG. 1.
Figure 3:
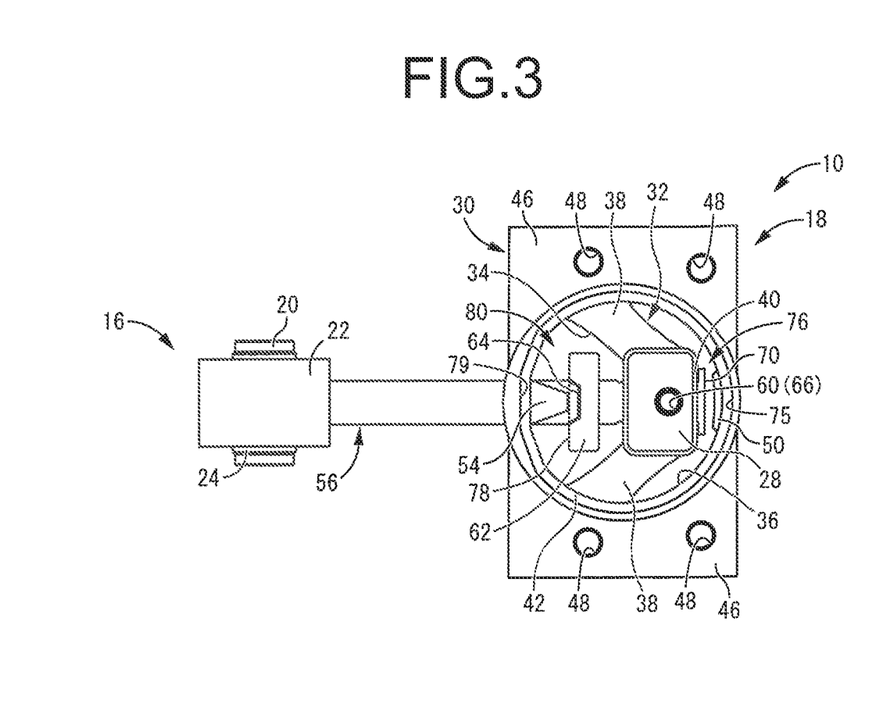
FIG. 3 is a bottom view of the torque rod shown in FIG. 1.
Figure 4:
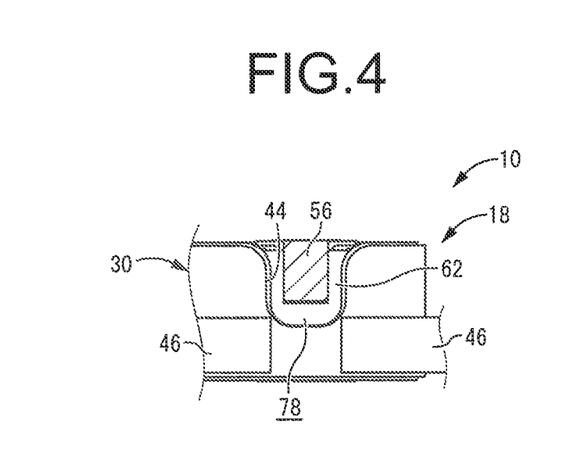
FIG. 4 is a cross sectional view taken along line 4-4 of FIG. 1.
Figure 5:
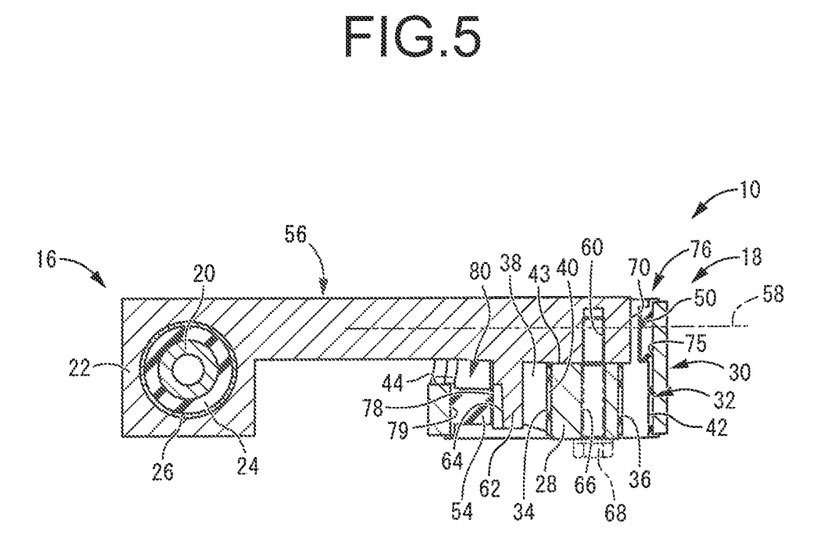
FIG. 5 is a cross sectional view taken along line 5-5 of FIG. 1.
Figure 6:
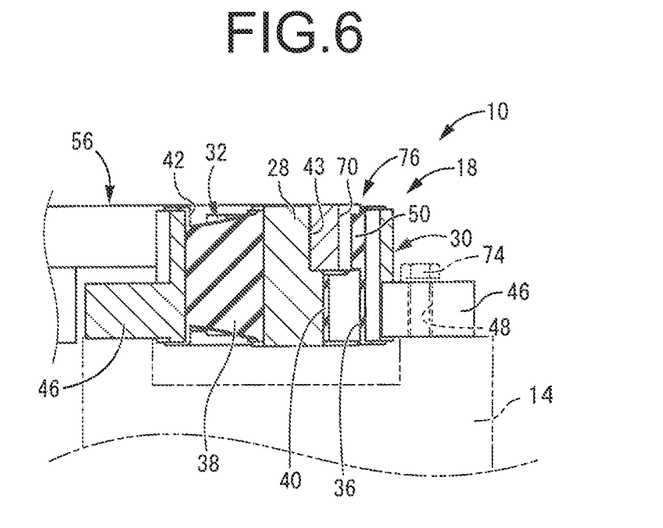
FIG. 6 is a cross sectional view taken along line 6-6 of FIG. 1.

First, FIGS. 1 to 6 show a torque rod 10 serving as an embodiment of the present invention. This torque rod 10 is interposed between a power unit 12 and a vehicle body 14, to elastically connect the power unit 12 with the vehicle body 14. Generally, a torque rod is mounted on the vehicle to extend in the vehicle front-back direction. In explanation hereafter, the left-right direction in FIG. 1 is the vehicle front-back direction. However, the torque rod 10 according to this invention is not limited to the torque rod mounted to extend in the vehicle front-back direction. In description hereafter, the up-down direction means the up-down direction in FIG. 2, while the left-right direction means the down-up direction in FIG. 1.

More specifically, the torque rod 10 of this embodiment extends in the vehicle front-back direction. A first rubber bushing 16 is provided at a lengthwise first end (on the left side in FIG. 1), while a second rubber bushing 18 is provided at a lengthwise second end (on the right side in FIG. 1), This second rubber bushing 18 is a rubber bushing according to this invention.

The first rubber bushing 16 has a first inner axial member 20 and a first outer tubular member 22 that have a substantially tubular shape extending in the left-right direction, and a first rubber elastic body 24 disposed radially between them. In other words, the first inner axial member 20 is inserted in the first outer tubular member 22, substantially coaxially, and the first inner axial member 20 and the first outer tubular member 22 are elastically connected by the first rubber elastic body 24. The axial dimension (the dimension in the up-down direction in FIG. 1) of the first inner axial member 20 is made larger than that of the first outer tubular member 22, so that the first inner axial member 20 protrudes from both axial sides of the first outer tubular member 22. In this embodiment, the outer peripheral shape of the first outer tubular member 22 is a generally rectangular shape.

In this embodiment, a metallic sleeve 26 is disposed externally about the first inner axial member 20. The first rubber elastic body 24 is fixed to the outer peripheral face of the first inner axial member 20, while the first rubber elastic body 24 is fixed to the radially inner face of the metallic sleeve 26. Especially, in the present embodiment, this first rubber elastic body 24 takes the form of an integrally vulcanization molded component incorporating the first inner axial member 20 and the metallic sleeve 26. This integrally vulcanization molded component is inserted in the first outer tubular member 22 in a compressed state and fixed to it, whereby the first rubber bushing 16 is constituted.

On the other hand, the second rubber bushing 18 has a second inner axial member 28 and a second outer tubular member 30 that have a substantially tubular shape extending in the up-down direction, and a second rubber elastic body 32 disposed between the radially opposed faces of them. In other words, the second inner axial member 28 is inserted in the second outer tubular member 30, and the both members 28, 30 are elastically connected by the second rubber elastic body 32. In this embodiment, the center axis of the second inner axial member 28 is deviated from the center axis of the second outer tubular member 30 to the vehicle back side, and the central axes are disposed as parallel to each other.

In the second rubber elastic body 32, lightening spaces 34, 36 are formed at both sides of the second inner axial member 28 in the vehicle front-back direction so as to pass through it in the up-down direction. The lightening spaces 34, 36 have prescribed circumferential dimensions. In this embodiment, the lightening space 34 located on the front side has a circumferential dimension smaller than a half circumference, while the lightening space 36 located on the back side has a circumferential dimension larger than a half circumference. Consequently, the second rubber elastic body 32 has a pair of rubber arms 38, 38 extending from the both left and right sides of the second inner axial member 28 diagonally to the vehicle front side. The second rubber elastic body 32 has such a shape that the separation distance in the left-right direction of the rubber arms 38, 38 grows gradually greater as it goes to the front side.

Covering rubber layers 40, 42 are fixed to the outer peripheral face of the second inner axial member 28 and the inner face of the second outer tubular member 30 across roughly the entirety thereof. The rubber arms 38, 38 and the covering rubber layers 40, 42 are integrally formed in the second rubber elastic body 32. In this embodiment, this second rubber elastic body 32 takes the form of an integrally vulcanization molded component incorporating the second inner axial member 28 and the second outer tubular member 30.

In the present embodiment, a mating groove 43 in a concave shape is formed in an axially top end face of the second inner axial member 28 so as to extend in the vehicle front-back direction (the left-right direction of FIG. 1) at the central portion of the face. The axially top end face of the second inner axial member 28 is lower in the central portion than in the both sides, by only the depth of the mating groove 43. With respect to the axial dimension of the second inner axial member 28, the maximum dimension of the part out of the mating groove 43 is substantially equal to the axial dimension of the second outer tubular member 30. Consequently, the lower end of the second inner axial member 28 and the lower end of the second outer tubular member 30 are located at about the same axial location. Meanwhile, the upper end of the part out of the mating groove 43 in the second inner axial member 28 is located at about the same axial position as the upper end of the second outer tubular member 30.

Moreover, in this embodiment, the substantial outer dimension of the first rubber bushing 16 and the substantial outer dimension of the second rubber bushing 18 are made different from each other such that the second rubber bushing 18 is larger than the first rubber bushing 16. Additionally, the inner diameter dimension of the second outer tubular member 30 is made larger than the inner diameter dimension of the first outer tubular member 22. By so doing, the second rubber elastic body 32 in the second rubber bushing 18 is larger than the first rubber elastic body 24 in the first rubber bushing 16 in whole size and rubber volume.

At the front portion of the second outer tubular member 30, a cut-out window 44 is formed to be opened upward in the upper end edge portion, which is the axial end edge. This cut-out window 44 has a generally rectangular shape, and it is formed through the second outer tubular member 30 in the thickness direction. The depth dimension (the dimension in the up-down direction) of the cut-out window 44 is not as deep as the bottom end edge portion of the second outer tubular member 30. In this embodiment, the depth dimension of the cut-out window 44 is about a half of the axial dimension of the second outer tubular member 30. As a result, the bottom end inner face in the inner face of this cut-out window 44 is positioned lower than the bottom face of the mating groove 43 in the top end face of the second inner axial member 28.

An attachment 46 that projects to the outer peripheral side is provided at around the lower part of the second outer tubular member 30. In this embodiment, from a location near the bottom end of the second outer tubular member 30, a pair of attachments 46, 46 projecting to both left and right sides are provided to expand with a shape of substantially thick plate and a prescribed circumferential length. Two bolt insertion holes 48 are formed at each of the attachments 46, 46, so as to penetrate it in the up-down direction.

In the covering rubber layer 42 that covers the inner face of the second outer tubular member 30, a cushioning rubber 50 is provided projecting to the vehicle front side from a part located on the vehicle back side. This cushioning rubber 50 is formed in the back portion of the covering rubber layer 42, at an axially upper part of the second outer tubular member 30.

Meanwhile, in a part located on the vehicle front side of the covering rubber layer 42, a central cushioning rubber 54 serving as a cushioning rubber is provided at a lower position than the cut-out window 44, projecting to the vehicle back side, that is, toward the second inner axial member 28. These cushioning rubber 50 and central cushioning rubber 54 are integrally formed by partially thickening the covering rubber layer 42. The central cushioning rubber 54 projects from the inner face of the second outer tubular member 30 to the vehicle back side.

The first rubber bushing 16 and the second rubber bushing 18 constructed as described above are mounted at both lengthwise ends of a rod member 56 that extends in the vehicle front-back direction, thus constituting the torque rod 10 of this embodiment. This rod member 56 is the rod member according to the present invention. The rod member 56 is an elongated member having a nearly rectangular cross section, and a high rigidity member made of metal or synthetic resin. In this embodiment, as indicated by the dot-and-dash line in FIG. 5, a center axis 58 of at least the vehicle back-side portion of the rod member 56 extends generally linearly. Particularly in this embodiment, the substantially entire rod member 56 extends roughly linearly in the vehicle front-back direction as substantially orthogonal to the center axis of the second rubber bushing 18. The first outer tubular member 22 in the first rubber bushing 16 is formed integrally with the lengthwise first end of the rod member 56 (on the left side in FIG. 1, i.e., the vehicle front side), with a center axis extending as nearly orthogonal to any of the center axis of the rod member 56 and the center axis of the second rubber bushing 18.

Besides, a bolt screw hole 60 is formed opening downward at the lengthwise second end of the rod member 56 (on the right side in FIG. 1, i.e., the vehicle back side). At the lengthwise second end of the rod member 56, an abutting projection 62 projecting downward is provided at a location closer to a lengthwise center than the bolt screw hole 60 is, i.e., on the lengthwise first side (the side of the first rubber bushing 16) relative to the bolt screw hole 60. This abutting projection 62 has a shape of substantially rectangular block smaller than the lightening space 34. The projection dimension from the rod member 56 (the up-down dimension) of the abutting projection 62 is nearly equal to or slightly smaller than the axial dimension of the formation part of the mating groove 43 in the second inner axial member 28 that constitutes the second rubber bushing 18. The left-right width dimension of the abutting projection 62 is larger than the width dimension in the lengthwise middle portion of the rod member 56. The abutting projection 62 projects from the rod member 56 to both sides in the left-right direction, while the left-right width dimension of the abutting projection 62 is larger than the left-right width dimension of the cut-out window 44 provided at the front side of the second outer tubular member 30.

In the vehicle front-side end face of this abutting projection 62, a notched portion 64 of recess structure is formed opening forward and downward at the center part in the left-right direction.

The integrally vulcanization molded component of the first rubber elastic body 24 is inserted in the first outer tubular member 22 provided at the lengthwise first end of the rod member 56 having this structure, in a press-fitted state and fixed to the first outer tubular member 22. Thus, the first rubber bushing 16 is provided at the lengthwise first end of the rod member 56.

On the other hand, to the lengthwise second end of the rod member 56, the second inner axial member 28 in the second rubber bushing 18 as a separate part is superposed from below, and the rod member 56 is fitted in the mating groove 43 of the second inner axial member 28. The height dimension of the rod member 56 is about the same as the depth dimension of the mating groove 43 of the second inner axial member 28. Specifically, the axially top end face of the second inner axial member 28 is superposed to the rod member 56 in a contact state at the bottom face of the mating groove 43. At both sides of the mating groove 43, the axially top end face of the second inner axial member 28 and the upper end face of the rod member 56 are aligned at nearly the same height. A fixing bolt 68 is inserted through an inner hole 66 of the second inner axial member 28 in the second rubber bushing 18 and threaded onto the bolt screw hole 60 of the rod member 56. As a result, the second rubber bushing 18 is securely provided at the lengthwise second end of the rod member 56. Therefore, in this embodiment, the fixture to the second inner axial member 28 of the second rubber bushing 18 is constituted in the rod member 56 including the bolt screw hole 60 provided at the rod member 56. In the second rubber bushing 18, the fixture to the lengthwise second end of the rod member 56 is constituted including the inner hole 66 provided in the second inner axial member 28.

In this state where the rod member 56 and the second rubber bushing 18 are fixed to each other, the lengthwise middle portion of the rod member 56 is inserted in the cut-out window 44 provided at the vehicle front side of the second outer tubular member 30 in the second rubber bushing 18, at at least one part in transverse cross section. Especially in this embodiment, with respect to its transverse cross section or height dimension, a half or more of the rod member 56 is inserted in the cut-out window 44. In other words, the rod member 56 extending from the vehicle front side extends to the radial inside of the second outer tubular member 30 via the cut-out window 44, and the second end of the rod member 56 is fixed to the second inner axial member 28, on the radial inside of the second outer tubular member 30. A vehicle back-side end face 70, which is the lengthwise second tip face of the rod member 56 is positioned on the vehicle back side of the second inner axial member 28. In the upper part of the second inner axial member 28, the vehicle back-side end face 70 of the rod member 56 and the second outer tubular member 30 are opposed with a prescribed distance in the vehicle front-back direction. In the present embodiment, the cushioning rubber 50 that projects to the vehicle front side is provided at the vehicle back side of the covering rubber layer 42 fixed to the inner face of the second outer tubular member 30. Thus, in the upper part of the second inner axial member 28, the vehicle back-side end face 70 of the rod member 56 and the second outer tubular member 30 are opposed to one another via the cushioning rubber 50, and the rod member 56 is abutted against the second outer tubular member 30 via the cushioning rubber 50.

Particularly in the present embodiment, the vehicle back-side end face 70 of the rod member 56 is a flat face expanding in a direction orthogonal to the center axis 58, with its left-right width dimension made larger than that of the lengthwise middle portion of the rod member 56. Consequently, when the rod member 56 is displaced to the vehicle back side relative to the second outer tubular member 30, it is possible to sufficiently largely keep an area of the contact section with the second outer tubular member 30 via the cushioning rubber 50.

Also, in the state where the rod member 56 and the second rubber bushing 18 are fixed to each other, the abutting projection 62 that extends downward from the rod member 56 is inserted in the lightening space 34 on the vehicle front side, which is provided between the radially opposite faces of the second inner axial member 28 and the second outer tubular member 30. In this embodiment, in the absence of external force exerted on the torque rod 10, the abutting projection 62 is inserted in the substantially central part of the lightening space 34, in a state that it is not abutted against any of the rubber arms 38, 38 and the central cushioning rubber 54 positioned radially outside the lightening space 34.

Specifically, both left-right ends of the abutting projection 62 extend out expanding to both circumferential sides of the second outer tubular member 30 from the rod member 56. Meanwhile, the central cushioning rubber 54 projects toward the center part in the circumferential direction (the left-right central part) of the abutting projection 62, whereby the circumferentially central part of the abutting projection 62 is opposed to the central cushioning rubber 54 with a prescribed distance in the vehicle front-back direction via the notched portion 64. In summary, the circumferentially central part of the abutting projection 62 is opposed to the vehicle front-side part of the second outer tubular member 30 (the lower part of the cut-out window 44) via the central cushioning rubber 54 in the vehicle front-back direction. Thus, the circumferentially central part of the abutting projection 62 is configured to be abutted against the second outer tubular member 30 via the central cushioning rubber 54.

In the torque rod 10 of this structure, an attaching bolt 72 is inserted through the first inner axial member 20 in the first rubber bushing 16 and threaded onto the power unit 12. Consequently, the first rubber bushing 16 is attached to the power unit 12, while an attaching bolt 74 is inserted through each of the bolt insertion holes 48 of the second outer tubular member 30 in the second rubber bushing 18 and threaded onto the vehicle body 14, whereby the second rubber bushing 18 is attached to the vehicle body 14. By so doing, the power unit 12 is elastically connected to the vehicle body 14 by the torque rod 10. In other words, the connection target members to be mutually connected by the torque rod 10 are the power unit 12 and the vehicle body 14, while the connection section in the power unit 12 and the connection section in the vehicle body 14 are constituted by the attachment parts of the first rubber bushing 16 and the second rubber bushing 18 of the torque rod 10.

Accelerating or decelerating the vehicle induces torque reaction force between the power unit 12 and the vehicle body 14. Relative displacement by the torque reaction force is limited in cushioned fashion by the torque rod 10 interposed between the power unit 12 and the vehicle body 14. This makes it possible to efficiently minimizing rotation of the power unit 12 relative to the vehicle body 14, for example around the principal axis of inertia. Then, for example, if torque reaction force occurs in a direction in which the connection section to the power unit 12 and the connection section to the vehicle body 14 in the torque rod 10 are made to approach each other, a compression force in the lengthwise direction is applied to the torque rod 10. As a result, in the second rubber bushing 18, the second inner axial member 28 fixed to the rod member 56 is displaced to the back side of the second outer tubular member 30 as accompanied by elastic deformation of the rubber arms 38, 38. Here, the separation distance between the rod member 56 and the second outer tubular member 30 is made smaller than the separation distance between the second inner axial member 28 and the second outer tubular member 30. Therefore, contact of the vehicle back-side end face 70 of the rod member 56 with the inner face of the second outer tubular member 30 limits relative displacement amount of the second inner axial member 28 and the second outer tubular member 30 in the second rubber bushing 18, and thus the displacement amount of the power unit 12 relative to the vehicle body 14 by the torque reaction force.

That is, in this embodiment, the vehicle back-side end face 70, which is the lengthwise second tip face of the rod member 56, and a vehicle back-side part 75 in the inner face of the second outer tubular member 30 are sections to be in contact with each other. The sections are opposed with the vehicle back-side lightening space 36 interposed, thereby constituting a first stopper 76 as a stopper to limit the relative displacement amount of the second inner axial member 28 and the second outer tubular member 30. Thus, the vehicle back-side end face 70 in the rod member 56 is a contact face that gets into contact with the second outer tubular member 30 so as to constitute the first stopper 76, and the contact sections are constituted including the vehicle back-side end face 70 of the rod member 56 and the vehicle back-side part 75 in the inner face of the second outer tubular member 30.

Particularly in the present embodiment, the vehicle back-side end face 70 of the rod member 56 and the second outer tubular member 30 are opposed, while having the cushioning rubber 50 provided between them. Consequently, the rod member 56 is abutted against the second outer tubular member 30 via the cushioning rubber 50. Therefore, it is possible to avoid impact and noise accompanying striking contact between the rod member 56 and the second outer tubular member 30.

On the other hand, if torque reaction force occurs in a direction in which the connection section to the power unit 12 and the connection section to the vehicle body 14 in the torque rod 10 are separated from each other, a tensile force in the lengthwise direction is applied to the torque rod 10. As a result, in the second rubber bushing 18, the second inner axial member 28 fixed to the rod member 56 is displaced to the front side relative to the second outer tubular member 30, as accompanied by the elastic deformation of the rubber arms 38, 38. Here, the separation distance between the abutting projection 62 of the rod member 56 and the second outer tubular member 30 is made smaller than the separation distance between the second inner axial member 28 and the second outer tubular member 30. Thus, a vehicle front-side face 78 of the abutting projection 62 is abutted against the inner face of the second outer tubular member 30, thereby limiting the relative displacement amount between the second inner axial member 28 and the second outer tubular member 30 in the second rubber bushing 18, and thus the displacement amount of the power unit 12 relative to the vehicle body 14 by torque reaction force.

Specifically, in the present embodiment, the abutting projection 62 of the rod member 56 and a vehicle front-side part 79 in the inner face of the second outer tubular member 30 are the contact sections to be abutted against each other. The contact sections are opposed within the vehicle front-side lightening space 34, thus constituting a second stopper 80 as the stopper to limit the relative displacement amount of the second inner axial member 28 and the second outer tubular member 30. Therefore, the vehicle front-side part 79 in the inner face of the second outer tubular member 30 is a contact face to the rod member 56. The contact sections constituting the second stopper 80 are constituted including the contact faces 78, 79 for the second outer tubular member 30 and the abutting projection 62.

Besides, in this embodiment, since the central cushioning rubber 54 projecting to the vehicle back side is provided, so that the abutting projection 62 and the central cushioning rubber 54 are abutted against each other. Consequently, cushioning action is exerted on external force to the vehicle front side of the rod member 56. Especially, the central cushioning rubber 54 for which deformation distortion on abutment gets large is abutted against the inner face of the recess-shaped notched portion 64. Deformation of the central cushioning rubber 54 is regulated in the inner face of this notched portion 64, whereby the spring characteristics of the central cushioning rubber 54 is adjusted and the durability improves.

In this way, in the present embodiment, the second stopper 80 and the first stopper 76 are provided at both front-back sides of the second inner axial member 28, in the lengthwise direction of the rod member 56. Thus, the displacement amount of the second inner axial member 28 relative to the second outer tubular member 30 is limited at opposite lengthwise sides.

In the torque rod 10 of this embodiment constructed as described above, the second outer tubular member 30 is fixed to the vehicle body 14, and the second inner axial member 28 is displaced within the second outer tubular member 30. This eliminates the necessity to provide a large space for displacement of the second outer tubular member 30 on the outer peripheral side, as described in JP-A-2000-065113. It is possible to minimize a disposition space around the second outer tubular member 30 required when mounting the second rubber bushing 18 fixed to the rod member 56 on the vehicle body 14.

In the torque rod 10 of this embodiment, the rod member 56 and the second rubber bushing 18 are separate parts. Thus, it is possible to change the design of one of the rod member 56 and the second rubber bushing 18, or differentiate mutual combination. Also, more efficient tuning of characteristics and use of some parts in common between different vehicle kinds are attained more easily.

In the second rubber bushing 18 of this embodiment, the second outer tubular member 30 is fixed to the vehicle body 14 by the attachments 46, 46 provided projecting on the outer peripheral face. This increases the degree of freedom in the structure, the shape, and the like of the fixation part in the vehicle body 14, compared with a press-fit-fastening structure.

In the torque rod 10 structured as described above, the stopper is constituted in the contact sections between the rod member 56 and the second outer tubular member 30. It is possible to prevent contact force by the stopper from directly acting on the fastening parts between the rod member 56 and the second inner axial member 28. This makes it possible to effectively avoid an adverse effect exerted on the fastening parts between the second inner axial member 28 and the rod member 56 or the like by a large contact force exerted on the stopper.

In this embodiment, in the first stopper 76, the rod member 56 extends linearly from the second rubber bushing 18, while the vehicle back-side end face 70 expands in a direction roughly orthogonal to the center axis 58 of the rod member 56. Thus, external force accompanying contact of the rod member 56 with the second outer tubular member 30 is exerted efficiently on the rod member 56 as an axial compression force. By so doing, it is possible to suppress bending or shear stress induced by the rod member 56 so as to further efficiently use the member strength of the rod member 56, and stopper load bearing capability can further improve.

In this embodiment, the first rubber bushing 16 and the second rubber bushing 18 are provided at both lengthwise ends of the torque rod 10, and the second rubber bushing 18 is given a larger outer dimension and a greater vibration-damping performance than the first rubber bushing 16. In this second rubber bushing 18, by using a fastening structure between the rod member 56 and the second inner axial member 28 and the stopper structure by direct contact between the rod member 56 and the second outer tubular member 30, it is possible in the large-sized second rubber bushing 18 to further efficiently realize compactification of the disposition space and improvement in the stopper load bearing capability.

Moreover, in the present embodiment, the rod member 56 is inserted in the cut-out window 44 of the second outer tubular member 30, thus making it possible to minimize the projection dimension of the rod member 56 from the second rubber bushing 18 and hence the disposition space of the torque rod 10. Extraction of the rod member 56 to the upper side of the second rubber bushing 18 through the cut-out window 44 when the rod member 56 is removed from the second rubber bushing 18 becomes also possible. If the rod member 56 which does not have the abutting projection 62 or the like is adopted, when removing the rod member 56 from the second rubber bushing 18, it is also possible to extract the rod member 56 to a side of the second rubber bushing 18 via the cut-out window 44.

The embodiment of this invention has been described above, but it is just an example. The present invention is not interpreted in any limited manner, by the specific description about this embodiment.

For example, in the aforesaid embodiment, the stopper constituted by the direct contact sections without interposing the second inner axial member 28, which are provided in the rod member 56 and the second outer tubular member 30, is constituted by the second stopper 80 on the vehicle front side and the first stopper 76 on the vehicle back side. However, the stopper is not limited to the above-mentioned embodiment. In other words, the stopper will do as long as one of the first stopper 76 and the second stopper 80 is provided.

Moreover, in the present invention, the cut-out window 44 provided in the second outer tubular member 30 is not indispensable. For example, it is also possible that the rod member has a curved shape and that the lengthwise second end of the rod member is disposed within the second outer tubular member 30 as going beyond the vehicle front-side wall of the second outer tubular member 30.

Furthermore, in this invention, well-known items can be used as appropriate without any limitation as the first rubber bushing 16, and for example, it is possible to employ a ball joint, a sliding sleeve, or the like. Also, with respect to the connection structure between the rod member 56 and the second inner axial member 28 in the second rubber bushing 18, it is possible to use many kinds of known connection structures such as welding, rivet, clinching, in addition to bolt fastening shown as an example.

Also if the first rubber bushing 16 is provided, the first rubber bushing 16 is not limited to the embodiment where the integrally vulcanization molded component of the first rubber elastic body 24 is press-fitted in the first outer tubular member 22 (the rod member 56) like the aforementioned embodiment. For the first rubber bushing 16, it is also possible that an integrally vulcanization molded component of the first rubber elastic body 24 incorporating the first inner axial member 20 and the first outer tubular member 22 is secured by being press-fitted into a cylindrical arm eye of the rod member 56.

In the above-described embodiment, the first rubber bushing 16 and the second rubber bushing 18 are provided, while the second rubber bushing 18 has a larger outer dimension than that of the first rubber bushing 16. However, the first rubber bushing 16 and the second rubber bushing 18 may have roughly the same size, and alternatively, the first rubber bushing 16 may have a larger outer dimension than that of the second rubber bushing 18. It is also possible to use the same structure as the second rubber bushing 18, for the first rubber bushing 16. Specifically, it is also possible that the first rubber bushing 16 is a part separate from the rod member 56 and that the first inner axial member 20 is fixed to the rod member 56 and that the rod member 56 and the first outer tubular member 22 constitute the stopper to limit relative displacement amount of the first inner axial member 20 and the first outer tubular member 22.

The cushioning rubber in the first stopper 76 or the second stopper 80 will do as long as it is located in at least one contact section in the rod member 56 and the second outer tubular member 30. Moreover, if the first stopper 76 by contact between the rod member 56 and the second outer tubular member 30 is adopted, for example, the second inner axial member 28 and the second outer tubular member 30 may be abutted against the first stopper 76 via the cushioning rubber or the like, in an assistive manner or additionally, in a range where the abutment does not affect the strength of the fixture for the inner axial member and the rod member, which is the subject of the present invention, namely a range where substantial stopper load does not act directly between the inner axial member and the rod member.

What is claimed is:

1. A torque rod comprising:
a rod member; and
a rubber bushing provided at a lengthwise end of the rod member, wherein
the rubber bushing includes an inner axial member, an outer tubular member, and a rubber elastic body connecting the inner axial member and the outer tubular member with each other,
the lengthwise end of the rod member is fixed to the inner axial member of the rubber bushing constituted by a part separate from the rod member,
a stopper to limit a relative displacement amount of the inner axial member and the outer tubular member in the rubber bushing is constituted in contact sections of the rod member and the outer tubular member, and
the rubber bushing includes lightening spaces provided at opposite sides of the inner axial member in a lengthwise direction of the rod member, and the stopper is constituted in each of the lightening spaces at the opposite sides so that the relative displacement amount of the inner axial member and the outer tubular member is limited at the opposite sides in the lengthwise direction of the rod member.

2. The torque rod according to claim 1, wherein
the torque rod has another rubber bushing with a different outer dimension from an outer dimension of the rubber bushing, at another lengthwise end of the rod member, and
the outer dimension of the rubber bushing is larger than the outer dimension of the other rubber bushing.

3. The torque rod according to claim 1, wherein the contact sections located at a lengthwise tip face of the rod member and the outer tubular member of the rubber bushing are opposed via a cushioning rubber in a lengthwise direction of the rod member so that a first stopper is constituted as the stopper.

4. The torque rod according to claim 1, wherein
an abutting projection configured to be inserted between opposite faces of the inner axial member and the outer tubular member of the rubber bushing is provided in the rod member and located closer to a lengthwise center of the rod member than a portion fixed to the inner axial member of the rubber bushing in the lengthwise end of the rod member is, and the abutting projection is opposed to the outer tubular member via a cushioning rubber in a lengthwise direction of the rod member so that a second stopper is constituted as the stopper.

5. The torque rod according to claim 4, wherein the abutting projection expands to both sides in a circumferential direction of the outer tubular member, and the cushioning rubber projects from an inner face of the outer tubular member toward a center of the abutting projection in the circumferential direction.

6. The torque rod according to claim 1, wherein the outer tubular member of the rubber bushing has a cut-out window opened at an axial end edge thereof, and the rod member fixed to the inner axial member of the rubber bushing is disposed to extend inward and outward of the outer tubular member in a state of being inserted through the cut-out window.

7. The torque rod according to claim 1, wherein an attachment projecting to an outer peripheral side is provided at the outer tubular member of the rubber bushing.

8. The torque rod according to claim 1, wherein the end of the rod member is superposed and fixed by bolting to an axial end face of the inner axial member of the rubber bushing.

9. A rod member configured to be attached to a rubber bushing including an inner axial member, an outer tubular member, and a rubber elastic body connecting the inner axial member and the outer tubular member with each other such that the rod member constitutes a torque rod, the rod member for the torque rod comprising, at one lengthwise end thereof:

a fixture to the inner axial member of the rubber bushing; and a contact section constituting a stopper to limit a relative displacement amount of the inner axial member and the outer tubular member of the rubber bushing by contact of the contact section on the outer tubular member of the rubber bushing, wherein an abutting projection configured to be inserted between opposite faces of the inner axial member and the outer tubular member of the rubber bushing is provided in the rod member and located closer to a lengthwise center of the rod member than a portion fixed to the inner axial member of the rubber bushing in the lengthwise end of the rod member is, and the abutting projection is opposed to the outer tubular member via a cushioning rubber in a lengthwise direction of the rod member so that a second stopper is constituted as the stopper.

10. A rubber bushing configured to be mounted at a lengthwise end of a rod member such that the rubber bushing constitutes a torque rod, the rubber bushing comprising:

an inner axial member;

an outer tubular member;

a rubber elastic body connecting the inner axial member and the outer tubular member with each other;

a fixture configured to receive the lengthwise end of the rod member, the fixture being provided in the inner axial member; and a contact section constituting a stopper to limit a relative displacement amount of the inner axial member and the outer tubular member by contact of the contact section on the rod member, the contact section being provided in the outer tubular member, wherein the rubber bushing includes lightening spaces provided at opposite sides of the inner axial member in a lengthwise direction of the rod member, and the stopper is constituted in each of the lightening spaces at the opposite sides so that the relative displacement amount of the inner axial member and the outer tubular member is limited at the opposite sides in the lengthwise direction of the rod member.

* * * * *